Nov. 21, 1950 D. T. CAST 2,530,450
CAR TOP SLEEPING COMPARTMENT
Filed Nov. 24, 1947 5 Sheets-Sheet 1

INVENTOR.
DON T. CAST
BY
Mawhinney & Mawhinney
ATTORNEYS

Nov. 21, 1950  D. T. CAST  2,530,450
CAR TOP SLEEPING COMPARTMENT

Filed Nov. 24, 1947  5 Sheets-Sheet 2

INVENTOR.
DON T. CAST
BY Mawhinney & Mawhinney
ATTORNEYS

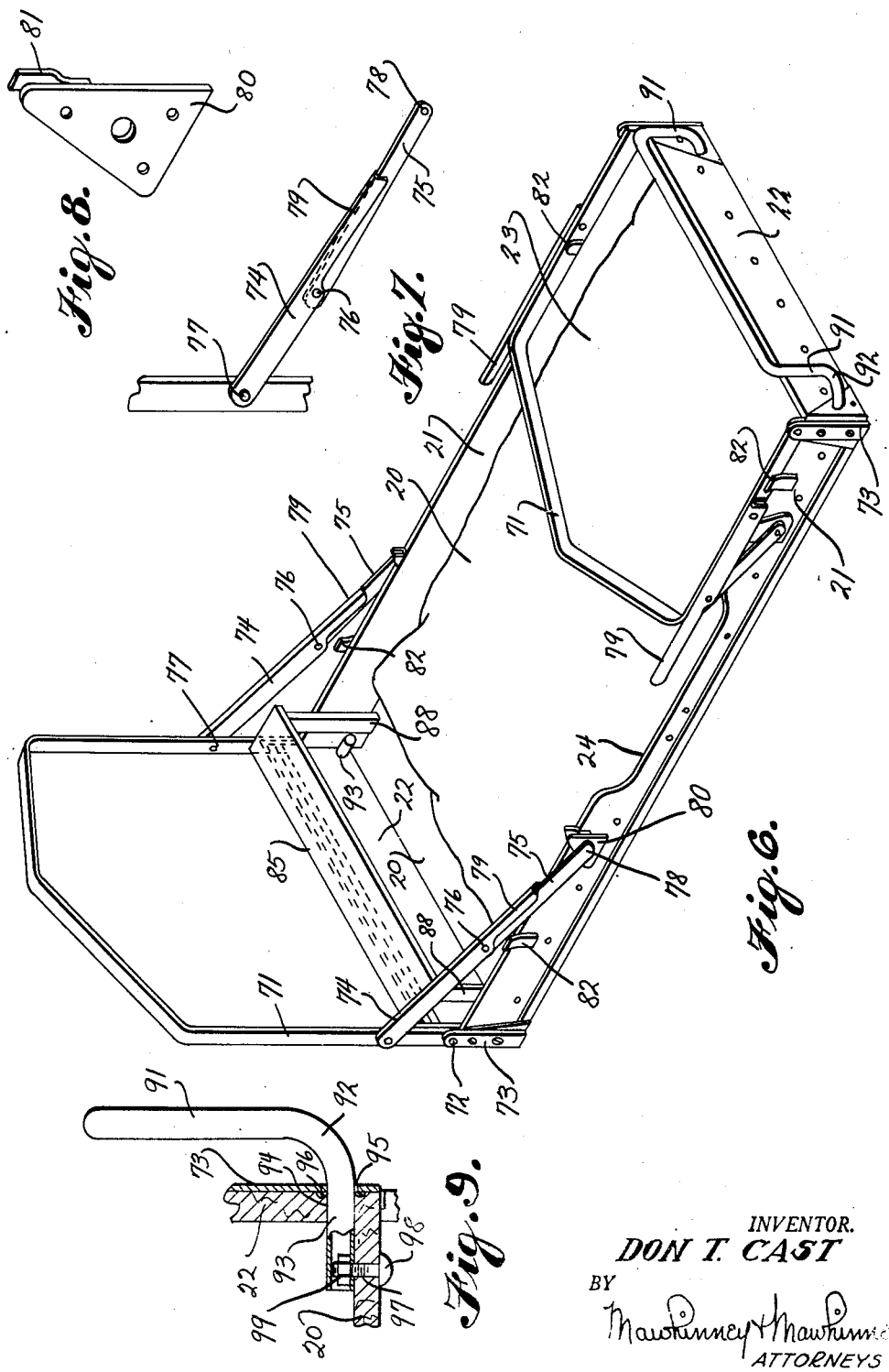

INVENTOR.
DON T. CAST

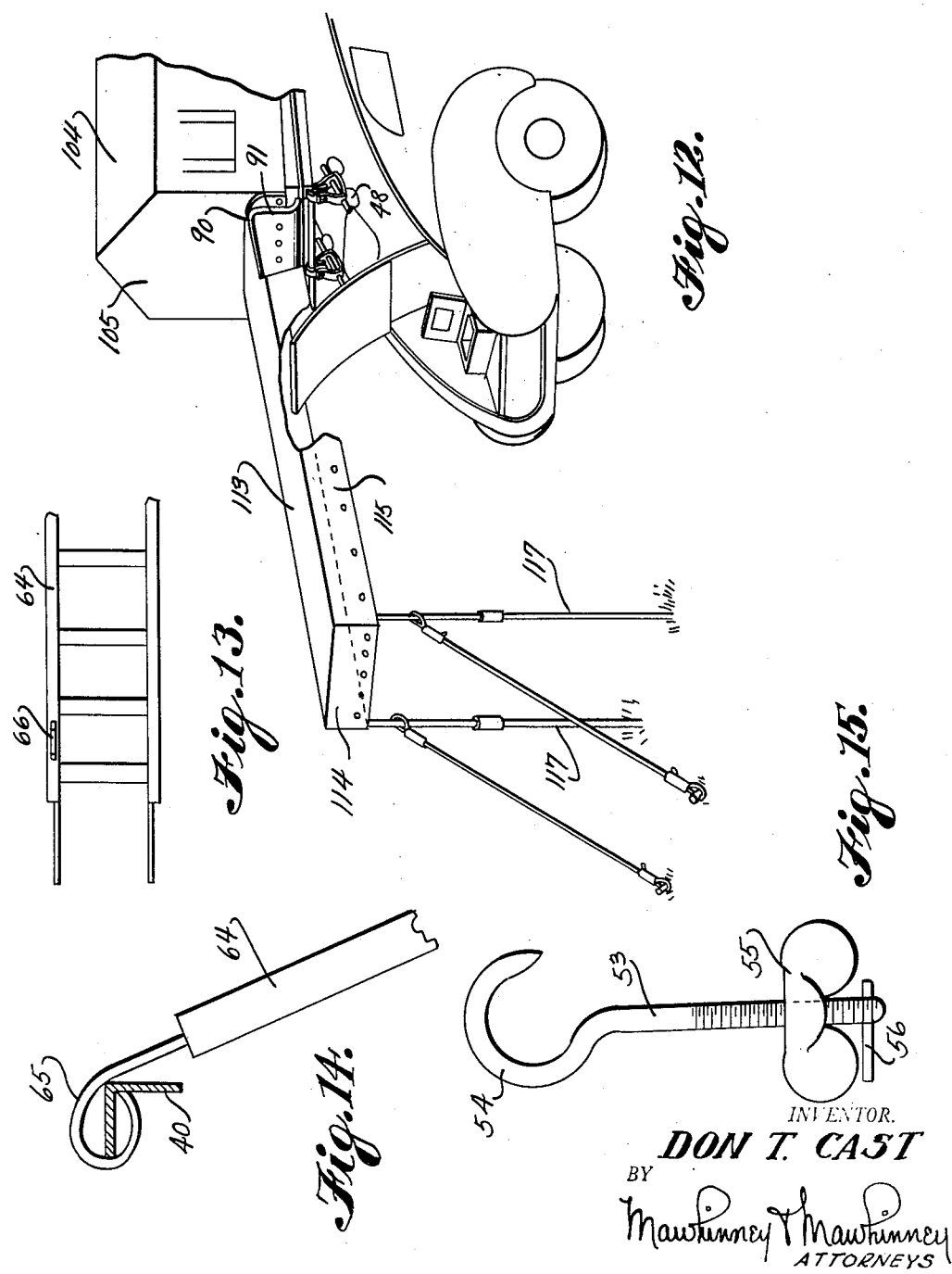

Patented Nov. 21, 1950

2,530,450

UNITED STATES PATENT OFFICE 2,530,450

CAR TOP SLEEPING COMPARTMENT

Don T. Cast, Columbus, Ohio

Application November 24, 1947, Serial No. 787,825

3 Claims. (Cl. 135—4)

The present invention relates to improvements in car top sleeping compartment and has for an object to provide an enclosed structure for mounting upon the top of an automobile or other vehicle affording facilities for occupancy and sleeping while on camping and automobile trips.

Another object of the invention is to provide an improved structure of sleeping compartment in which the device is demountably attached to the top of an automobile or other vehicle by means of a rack or undercarriage which has adjustable features in accommodating the same to various contours encountered in the roofs of various makes of automobiles, and in which provision is made on the sleeping structure for receiving the same upon the rack or undercarriage in a novel manner for efficient and sturdy support thereon and for quick and easy mounting and demounting.

The invention has for its further purpose to provide an improved sleeping compartment structure in which the entire structure is designed for removal from the top of the automobile with provision for its support at an elevation above the ground where it may be utilized for sleeping or for occupancy apart from the vehicle itself.

A still further object of the invention is to provide for a foldable structure which during movement of the car may be collapsed into relatively small compass affording a minimum of wind resistance and enabling the same to be adequately encased in a weather proof slip cover; such slip cover being so mounted in relation to the structure that the same may be drawn rearwardly to constitute an awning projecting out over the trunk of the vehicle and rearwardly behind the same so as to protect the users from the elements when operating at the rear deck for cooking or other purposes; and more particularly in connection with this object and purposes the invention further contemplates the cooperation of side portions of the slip cover with end rounded portions of a boat rack or handle in order to automatically shape the side edge portions of the slip cover into downwardly projecting valances.

The invention has for its still further purpose provision for carrying a ladder useful in ascending to and descending from the elevated compartment on the top of the car.

The invention has for a still further purpose the provision of combination boat racks and handles which in the collapsed and covered position of the structure upstand beyond the same in a position to unimpededly receive a boat, canoe or the like which may be transported by the vehicle along with the sleeping compartment.

The invention has for its still further purpose to provide a novel form of foldable seat in the sleeping compartment capable of being erected to a sufficiently high level for convenient use as a seat and collapsible to a relatively low position within the sleeping compartment structure when not in use.

With the foregoing and other objects in view the invention will be more particularly described hereinafter and more particularly pointed out in the appended claims.

In the drawings in which like parts are denoted by the same reference characters throughout the several views, Figure 1 is a perspective view of an automobile shown equipped with a car top sleeping compartment in accordance with the present invention and shown in the collapsed position for running.

Figure 6 is a perspective view of the box taken from above and showing one of the bows erect and the other collapsed.

Figure 7 is a fragmentary perspective view showing the knees and handle.

Figure 8 is a perspective view of the pivot plate and clip.

Figure 9 is a vertical section taken through the box showing the method of mounting the boat rack.

Figure 12 is a fragmentary perspective view of the car, set up compartment and slip cover showing its use as an awning over the space back of the car deck.

Figure 13 is a fragmentary plan view of a form of ladder employed.

Figure 14 is a fragmentary side view of the ladder showing its hook engaged with the car rack mounting rail illustrated in section, and Figure 15 is a side view of a form of hook bolt employed between the compartment and the car rack.

Figure 1:
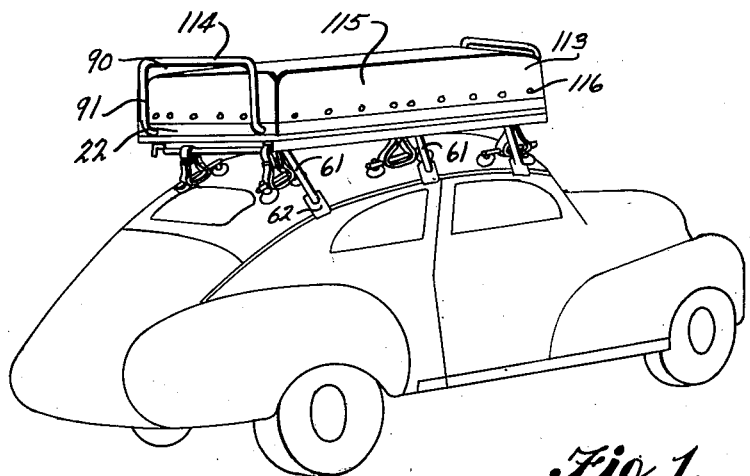
Figure 2:
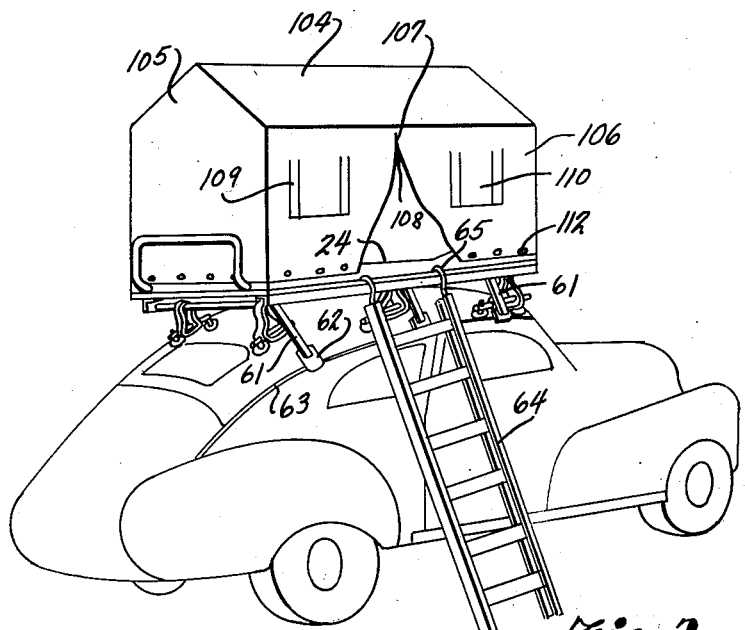
Figure 2 is a similar view showing the compartment elevated and in condition for use.
Figure 5:
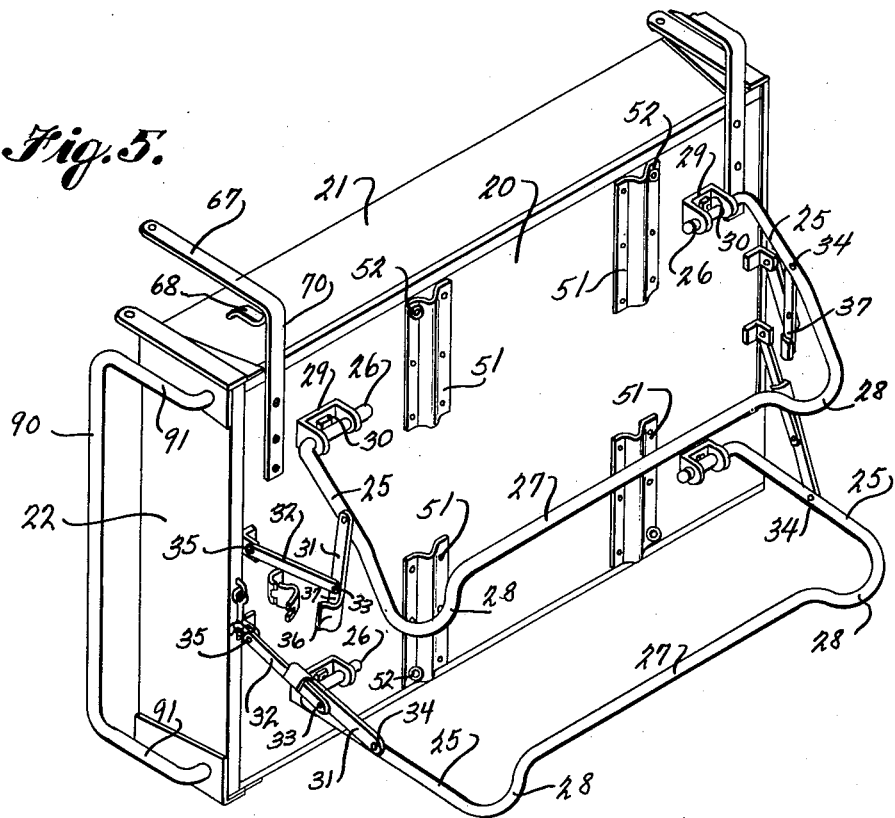
Figure 5 is a bottom perspective view of the compartment box showing its equipment for support on the rack.
Figure 4:
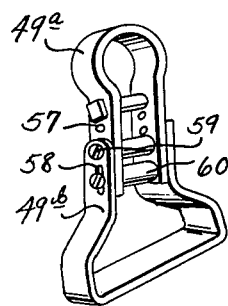
Figure 4 is a perspective view of a form of suction cup bracket employed.
Figure 3:
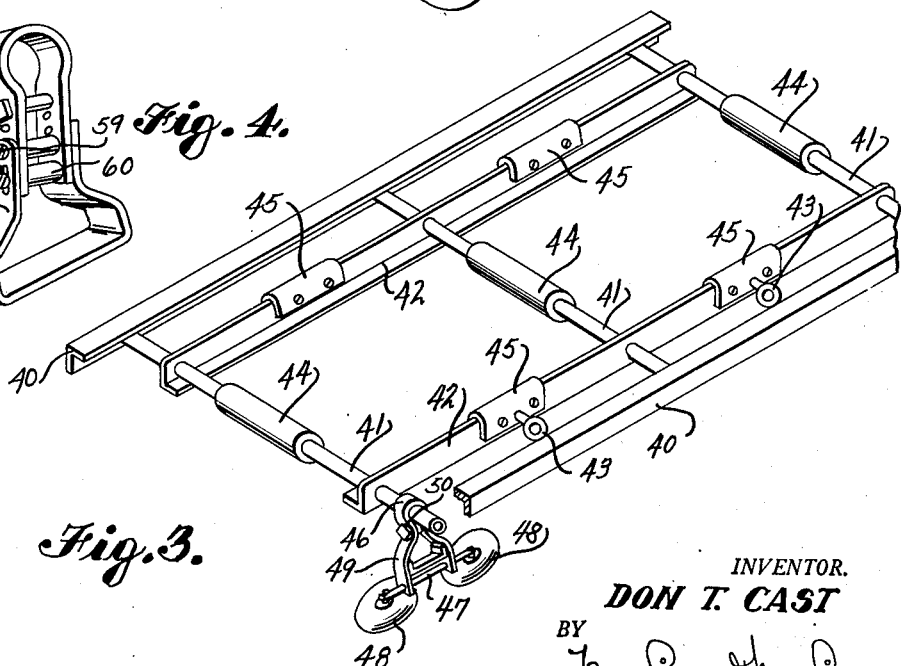
Figure 3 is a fragmentary perspective view of an improved form of car rack.
Figure 10:
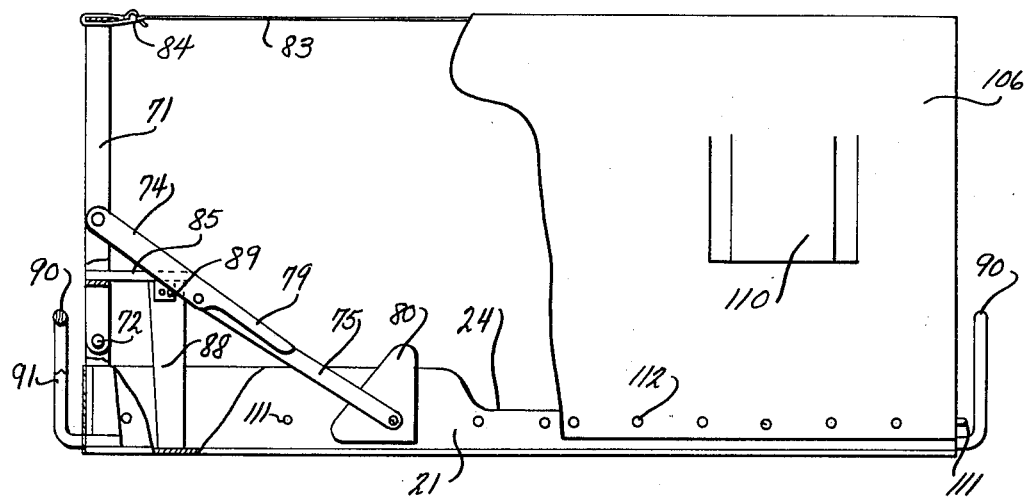
Figure 10 is a side elevational view of the compartment in erect position with a part of the covering and left bow broken away.
Figure 11:
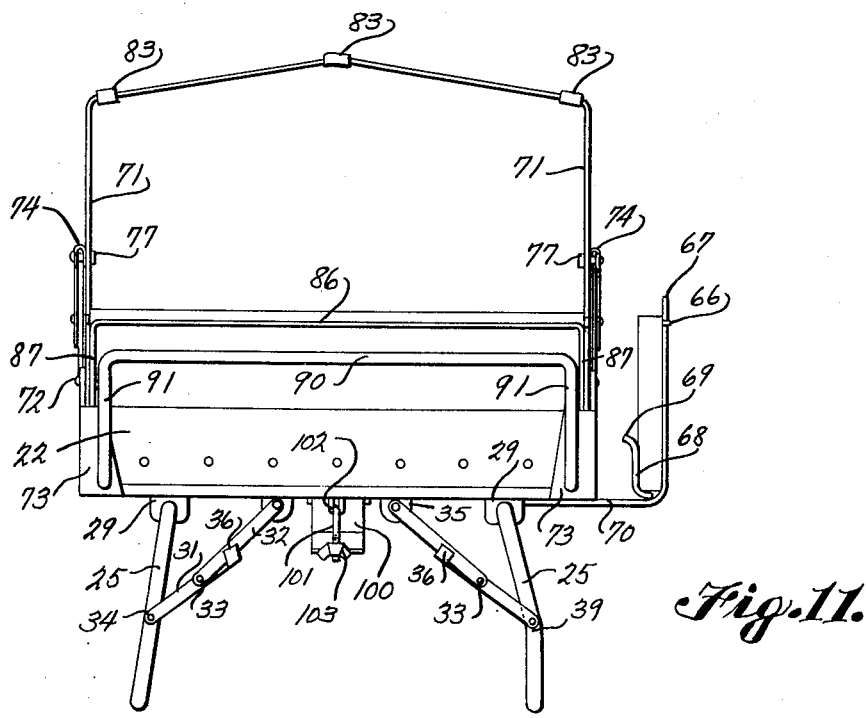
Figure 11 is an end elevational view of the compartment as set up for use on the ground.

Referring more particularly to the drawings 20 designates the bottom of the compartment structure, 21 upstanding longitudinal walls or side rails and 22 the upstanding front and rear end walls which form a box like construction completely open at the top and of sufficient depth only to retain the pneumatic or other mattress 23, pillows, bedding and the like and to assist with the curtain construction in preventing the occupants from accidentally rolling out of the compartment.

One side rail 21 is preferably cut down as indicated at 24 in an intermediate portion thereof to enable occupants to more conveniently enter and leave the compartment; this cut down portion 24 being exposed at the right hand side of the car or vehicle whereby users will enter and leave the compartment from the curb side of the car only to avoid accidents which might occur from setting up the ladder at the road side of the vehicle.

The box structure formed by the bottom 20 and the upstanding walls 21 and 22 also provides a luggage compartment in which luggage and other traveling gear may be loaded and conveniently transported.

To the base of the bottom 20 are pivotally attached tubular supporting members. Two such members are provided one at each side of the box structure. Each such member comprises shanks 25 having inturned trunnions 26 at one end thereof and connected at their other ends by tubular runners 27 having downwardly offset feet 28 adjacent the front and rear ends thereof. The trunnions 26 are rotatably mounted in suitable bearings 29 projecting from the bottom 20 and affixed thereto as by the bolts or other fastenings 30.

The supports may be held rigidly in the lowered supporting position by means of toggle braces which may be four in number and each of which comprises a pair of links 31 and 32 pivoted together at 33 and respectively to the supports at 34 and to the bottom 20 at 35. Such links 31 and 32 break downwardly in the collapsing movements of the supports and one of each pair of links, in this instance the link 31 carries a spring clip 36 on a tail piece 37 thereof which overlaps the pivot joint 33 and which enables the clip 36 to clamp about the companion link 32 in the expanded or straight position of the links in which the center pivot 33 is preferably above or inwardly of the line between the pivots 34 and 35 to constitute a toggle lock for preventing the casual collapse of the supports 25, 27. The shanks 25 at one side are bent as indicated at 39 to clear the companion support in its folded position.

The rack or undercarriage may comprise a pair of substantially parallel longitudinal angle iron side rails 40 to which are rigidly attached three transverse supports 41. Longitudinal reinforcing bars or angle iron members 42 are also affixed to the transverse supports 41, the same being spaced inwardly from the side rails 40 to allow sufficient space therebetween on the transverse supports 41 for the adjustment of the cup carriers.

Eye brackets 43 are mounted on the inner rails 42, the same being preferably four in number, two on each rail 42.

The transverse supports 41 carry cushions 44 between the inner rails 42. Similar cushions 45 are carried by the inner rails 42, such cushions being preferably four in number.

Suction cup brackets are slidably mounted on the transverse supports 41 between the rails 40 and 42 and comprise collars 46 and depending arms 49 made from metal possessing some inherent resiliency and adapted to spring outwardly so as to tend to loosen the collars 46 on the transverse supports 41. Bolts 50 are connected to the arms 49 across the lower open ends of the collars 46 to contract the collars tightly about the transverse supports 41 to frictionally bind the cup supports on the transverse members 41.

In the lower portions of the brackets 49 are affixed rods 47 to which the suction cups 48 are attached. These suction cups are adapted to be compressed tightly against the upper roof surface of the vehicle.

The bottom 20 carries at its under side four rests 51 which may be in the form of V-shaped angle iron or metallic pieces positioned on the box structure so as to rest upon the cushions 45 of the inner rails 42 of the rack or undercarriage. The runners 27 in the folded condition collapsed beneath the bottom 20 rest upon the cushions 44 carried by the transverse supports 41. These rests 51 also carry eyes 52 located vertically above the eyes 43 of the inner rails 42 whereby hook bolts 53 may pass through the registering eyes 52 and 43, the hooks 54 engaging over the upper eyes 52 while wing nuts 55 threaded on the lower threaded ends of the hook bolts 53 are tightened up against the lower sides of the rack eyes 43, thus pulling the hooks 54 down tight upon the upper eyes 52. Cotter keys 56 or other fastenings may be mounted through the lower end portions of the hook bolts 53 to prevent the nuts 55 backing down away from the lower eyes 43. It will be noted that the lower eyes 43 are larger than the external diameter of the hook bolts 53 to enable a certain freedom of movement of the bolts in adjusting the hooks 54 thereof through the upper eyes 52 in the assembling operation.

The rear suction cup brackets are constructed and arranged to give vertical adjustability as required by the curvature of the car roof and the arms of these brackets are divided into upper and lower sections 49$^a$ and 49$^b$ adapted to overlap and have in their adjacent portions series of holes 57 and 58. These holes are adapted to register for the passage of two or more bolts 59 about which are carried spacing sleeves 60 which prevent the bolts when tightened from collapsing the arms together.

Straps 61 are affixed to the inner rails 42 and carry at their free ends clips 62 for engaging the rain trough 63 of the vehicle.

A ladder 64 is carried as a part of the equipment and has formed at its upper end hooks 65 adapted to engage over the mounting bar or rail 40. These hooks are of resilient metal and are adapted to be expanded by the weight of the ladder in descending in an arcuate movement about the mounting rail 40 as a center after positioning the hooks 65 over the mounting rail 40 in an initial position with the free ends of the hooks engaged beneath the horizontal flange of the mounting bar 40 in which position the opposite diametric portions of the hooks engage the external corner angle of the mounting bar 40. The ladder is then permitted to rotate downwardly until its lower end strikes the ground and in executing this arcuate movement the free ends of the hooks 65 are brought forcibly beneath the inner free under edge of the horizontal flange of the mounting bar 40. In other words the curvature of the spring hooks 65 is such that this rotational movement of the hooks 65 about the corner of the angle iron causes the free ends of the hooks to expand and the resulting reaction due to the elasticity causes the hooks to frictionally bind with great force beneath the horizontal flange and communicate a like binding or constricting movement to the hooks 65 upon the external corner of the rail 40. In this way the ladder is bound tightly to the holding bar 40 and is not apt to become dislodged under the weight of the user. Otherwise stated the inner surface of the hooks 65 describe a volute curve in which the portion most remote from the center is that adjacent the ladder and from this point the curve progresses around to the free ends of the hooks which are the points closest to the center.

The ladders have at one side open metal clips or straps 66 positioned to engage over the higher outer arms 67 of pairs of clip arms, the inner lower arms 68 of which have inwardly flared upper edge lips 69 for guiding the ladder between these spring clip arms or members 67 and 68 and down upon the bases of the clips, which clips are supported by outriggers 70 carried by the bottom 20 of the box like structure. This construction binds the ladder firmly in the clips against any noise or rattling incident to vibration in the travel of the vehicle, the straps 66 preventing any longitudinal creeping of the ladder in the clips which might result in the ladders escaping from one or both such clips.

Referring more particularly to the enclosure or superstructure, 71 designates bows of resilient metal, such as aluminum with their lower ends pivoted as indicated at 72 upon upstanding portions of corner angle brackets 73 which brackets are arranged to reinforce the external corner portions of the box.

The bows are held in place in the upper position by knees 74 and 75 which are pivoted together at 76 and to the bows at 77 and to the box at 78. The pivots 76 in the straight position of the knees 74 and 75 are below the line connecting the pivots 77 and 78 whereby the knees tend to bend downwardly incident to the weight and tension of the canvas supported by the bows 71 tending to pull the bows inwardly and downwardly. Thus the knees are arranged to form a toggle lock to prevent the accidental collapse of the superstructure. The upper knees 74 are of channel construction with the openings disposed downwardly to receive the lower knees 75 within the channel. Handles 79 on the upper channel knees 74 project downwardly beyond the pivot points 76 and overlap the lower knees 75 upon which such channel handles 79 are adapted to abut. The principal purpose of these handles 79 is to give leverage in moving the knees to the extended position, it being remembered that the weight of the canvas or other material is borne by the bows 71 and must be raised in the elevated and taut final position, and the handles 79 give the necessary leverage for accomplishing this purpose. The handles 79 also preferably partake of the channel or part channel shape of the upper knees 74 of which they are parts, this being desirable in order to reinforce and strengthen the handles and to prevent the hand of the user from being pinched between the handles 79 and the lower knees 75

The lower pivots 78 are mounted through face plates 80 attached to the outstanding faces of the longitudinal rails of the box. These face plates project upwardly beyond the upper edges of the side rails 21 and carry spring clips 81 positioned to receive the side edges of the bows 71 when in the lowered position. Guide fingers 82 having outwardly curved upper ends upstand from the side rails 21, being spaced from the clips 81 and being so placed and bent with reference to the clips 81 that the resilient metal bows 71 are subjected to pressure in relatively opposite directions thus placing the bows under tension and causing the same to engage in the clips 81 with a tight frictional fit to avoid rattling and escape.

Connected between the bows are three or more straps 83 which are adapted to be drawn taught when the bows are elevated and moved to final upright position. These straps 83 have included therein adjusting buckles 84 for the purpose of taking up slack therein and maintaining their taut condition at all time suitable for the support of the canvas or enclosure material.

In the rear end of the compartment a seat 85 is mounted upon a metallic strap 86 which extends all the way across beneath the rear portion of the seat to which it is affixed, said strap 86 having downturned arms 87, pivoted to the corner brackets on the same pivots 72 to which the bows are attached.

The arms 87 are adapted to assume a substantially vertical position when the seat 85 is in the upper position of use. Legs 88 are hinged as indicated at 89 beneath the seat 85 so as to swing in a transverse direction inwardly of the seat and to fall by gravity down to a position of use when the seat is elevated; such legs 88 being at the front corner portions of the seat or at the corner portions forwardly of the arms 87. By manually collapsing the legs 88 beneath the seat, the seat will drop automatically forward due to the overbalance on the pivot pins 72 and will come to rest when the arms 87 encounter the upper edges of the longitudinal box rails 21. When its use is desired the seat may simply be lifted by inserting the hand beneath the forward edge and rotating the seat about the pivots 72 until the same arrives at the upright position whereupon the legs 88 will fall by gravity into upright position and engage the bottom 20 of the box. In its lower position the seat 85 will extend below the combined boat racks and handles 90, one of which is mounted at each end of the structure beyond the end walls 22. These boat racks or handles comprise horizontal bars supported by downturned arms 91 having curved elbow sections 92 which outstand from the end walls 22 and are supported by shanks 93, the handles 90, arms 91 and shanks 93 being of a tubular construction preferably cylindrical in cross section. The handles or horizontal members 90 are carried at a substantial distance above the upper edges of the end walls 22 which constitute the head and rear boards of the box; this being for the purpose of receiving a boat or the like when the bows 71 are in the lowered position. The shanks 93 pass through openings 94 in the end boards 22. Such shanks also pass through openings in the corner brackets 73. Annular gaskets 95 rounded in cross section are fitted in countersunk annular sockets made in the outer surfaces of the end boards 22 in position to contact and extend about the shanks 93 and to be engaged by the corner brackets 73 in such wise as to be compressed in the sockets 96 and caused to expand inwardly against the sockets 93 thus providing a gas-tight fit for preventing rain and the elements from gaining access to the interior of the box particularly when wind driven incident to high vehicle speeds.

The shanks 93 are held in place by bolts 97 passed through the bottom 20 and having heads 98 on their lower ends and nuts 99 threaded on their upper portions and enclosed within the tubular structure of the shanks 93 which because of the rounded smooth contours of their external walls form appropriate housings for the bolt ends and the nuts 99 to prevent contact of the mattresses, pillows, bedding and the like with any parts that might injure or destroy the same.

The supports 25, 27 are held in place by hasps 100 hinged to the bottom 20 and engaged by eye bolts 101 fastened by staples 102 or otherwise to the bottom, such eye bolts having wing nuts 103 threaded thereon to maintain the hasps in engaged position with the shanks 25 of the supports. The bows 71 and tapes 83 support a flexible covering which is waterproofed against the weather, such covering comprising generally a top 104, end walls 105 and side walls 106 all combined together in a box-like construction which is simply slipped over the bows 71 when the same are in the partially collapsed condition; the flexible covering being drawn taut when the bows are elevated to final position.

The side walls have substantially central vertical slits or openings 107 therein for the purpose of entry to the enclosed compartment. These openings 107 may be closed by zippers 108 or other appropriate fastenings.

The side walls 106 may be provided with windows 109, preferably screened, such windows being shown as four in number and located at opposite sides of the openings 107. Covers 110 are arranged on the outside of the windows 109 and draw cords or other arrangements may be used to raise and lower these coverings 110.

The flexible covering is secured in place in a taut condition by the use of snap fasteners 112 in any suitable number carried by the lower edges of the flexible covering walls along both the sides and ends of the covering; such snap fastenings being arranged to snap over complemental pins 111 which project out from the side and end walls of the box structure.

A slip cover 113 is arranged to conceal and cover the device when collapsed, such slip cover having the end walls 114 and the side walls 115; such walls being equipped with snap fasteners 116 to engage over the pins 111 to bind the slip cover firmly in place all around the box-like structure.

The slip cover also performs the double function of an awning by disengaging the snap fasteners 116 along the forward and side edges of the slip cover and leaving the rear wall snap fasteners engaged and thereupon rolling the slip cover rearwardly upon the rear boat rack and handle horizontal bar 90. Due to the fact that the rear end of the slip cover is anchored this movement acts to turn the slip cover inside out so that the inside of the cover is now presented upwardly.

The slip cover is thus made to extend on an inclination backwardly of the body of the vehicle and over the trunk of the vehicle and the same is long enough to extend a substantial distance rearwardly beyond the trunk to cover and protect a space in which the user may stand while performing certain operations using the deck of the trunk as an operating base. Poles or supports 117 are attached to the rear corners of the awning for purpose of support and these poles may be maintained in proper erect position by guy ropes or other suitable braces.

It is important to note in connection with the use of the slip cover as an awning that the rear boat rack or handle 90 cooperates with the slip cover in that it constitutes a shaping member for retaining the forward portion of the awning along the top thereof and the rounded corner portions 92 of this handle 90 shape the side walls 115 of the slip cover down into valances for the awning which extend down horizontally along longitudinal side edges of such awning. For this purpose the handles 99 are of slightly less transverse length than the width of the awning so that the slip cover side walls 115 will be brought to a proper position with respect to the end elbows 92 of the handle 90 when the slip cover is turned backwardly to form the awning. The handle 90 also serves to take the strain off the pins and the snap fastenings 116 which secure the rear end wall 114 of the slip cover to the box structure.

In the use of the device, for purposes of transportation the bows are folded down toward one another by first releasing the knees 74 and 75 for which purpose the handles 79 are extremely effective. The flexible cover collapses with the bows and the entire structure is foldable down to a low level which is appreciably lower than the boat racks and handles 90. The slip cover is then put in place and fastened down so as to cover the entire device and such slip cover forms a continuous covering offering no crevices or openings for wind at high vehicle speeds. The slip cover also besides being a protection forms a neat and attractive cover for the device when collapsed and during movement of the vehicle from place to place.

In its collapsed condition the bows, flexible covering and the slip cover offer no interference to the placing of a boat upon the boat rails 90.

On reaching destination the slip cover is easily and quickly removed by detaching the snap fasteners and rolling the same backwardly to expose the flexible cover beneath which is thereupon raised by lifting the bows and fastening the knees 74 and 75 in place.

The ladder is of course first removed from the supports in order to gain access to the top of the car for the purpose of removing the slip cover and this ladder is attached to the rack or undercarriage in a manner heretofore described.

As soon as the slip cover is folded back, the bows are raised and the knees 74 and 75 fixed into outstretched condition. In this way the flexible covering is raised and drawn taut across the bows and straps and the compartment is in readiness for use just as it is in place on top of the vehicle. Access may be had to the compartment from either side of the flexible covering by opening the zipper or other fastenings 108.

Where the compartment is to be removed from the top of the vehicle and placed upon the ground, the same may be first detached from the rack or undercarriage and thereupon turned at substantially right angles upon such rack or undercarriage with the purpose of enabling the runners 27 to engage the side rail or mounting bar 40. The compartment may then be tilted slightly and slid laterally down the side bar 40 until it reaches the ground; whereupon the upper end may be lifted around until the entire compartment is on the ground.

The support 25—27 may then be rotated about their trunnions 26 in order to provide a proper elevated structure for supporting the compartment at a suitable height from the ground; the support structure 25—27 being ultimately locked in place by the toggle braces 31, 32. The rack supports 90 also perform the functions of handles in thus removing the compartment from the automobile top and for carrying the same from the vehicle to a suitable camping site where it may be desired to set up the sleeping compartment.

In traveling with the compartment on top of the vehicle, stops may be made at an attractive road side place for lunch or refreshments or the like in which event it may be desirable to fold the slip cover backwardly and to provide an awning in the manner heretofore described, such awning furnishing protection against the sun or other elements. The flexible covering will be so constructed and arranged and fitted to the bows that a tight friction fit is had resulting in the clinging of the covering to the bows in the elevating and collapsing position of the bows. The end covering clings to the bows in the collapsed position of the bows during transportation with the result that when the bows are raised the covering is automatically raised with the bows without any relative movement and consequent friction between the two which would make it difficult and awkward to set up the compartment on reaching destination.

It is obvious that various changes and modifications may be made in the details of construction and design of the above specifically described embodiment of this invention without departing from the spirit thereof, such changes and modifications being restricted only by the scope of the following claims.

What is claimed is:

1. For use with a car top demountable sleeping compartment comprising a box, upstanding flanges at the four corners thereof, bows pivotally carried by said upstanding flanges at opposite ends of said box, face plates carried by the sides of said box, upper knee members pivotally carried by said bows at a point removed from the upstanding flanges, lower knee members one end of which are pivoted to said face plates and the other end of which are pivoted to said upper knee members, said upper knee member extending beyond the pivot between the said upper knee members and lower knee members forming handles for raising and lowering said bows, and a flexible cover carried by said bows.

2. A demountable sleeping compartment as claimed in claim 1 characterized by the fact that said upper knee members are of channel construction permitting the insertion of the lower knee member between the depending flanges and wherein the pivot point for said lower knee member is removed from the plane between the pivots of the face plates and the bows whereby when the bows are in the erected position the extensions envelope the end portion of the lower knee members forming a toggle lock.

3. A car top demountable sleeping compartment as claimed in claim 2 further comprising spring clips carried by said face plates on the opposite sides thereof from the pivot of said lower knee members positioned to receive and retain said bows when said bows are in the collapsed or traveling position.

DON T. CAST.

REFERENCES CITED

The following references are of record in the file of this patent:

UNITED STATES PATENTS

| Number | Name | Date |
| --- | --- | --- |
| 1,468,197 | Downing | Sept. 18, 1923 |
| 1,483,640 | Manning | Feb. 12, 1924 |
| 1,512,725 | Thomas | Oct. 21, 1924 |
| 1,748,282 | Ellis | Feb. 25, 1930 |
| 1,772,439 | Garbs | Aug. 5, 1930 |
| 1,984,681 | Jackson | Dec. 18, 1934 |
| 2,139,849 | Powers | Dec. 13, 1938 |
| 2,222,636 | Stauss | Nov. 26, 1940 |
| 2,291,900 | Jimmes | Aug. 4, 1942 |
| 2,440,821 | Godwin | May 4, 1948 |
| 2,446,092 | Lait | July 27, 1948 |
| 2,464,884 | Noyes | Mar. 22, 1949 |